United States Patent [19]
Yamaguchi et al.

[11] 4,097,804
[45] Jun. 27, 1978

[54] TRANSMITTING AND RECEIVING DIVERSITY SYSTEM

[75] Inventors: Masahisa Yamaguchi, Tokyo; Tatsuo Watanabe, Mitaka, both of Japan

[73] Assignee: Kokusai Denshin Denwa Kabushiki Kaisha, Japan

[21] Appl. No.: 736,133

[22] Filed: Oct. 27, 1976

[30] Foreign Application Priority Data

Oct. 30, 1975 Japan .................................. 50-130840

[51] Int. Cl.$^2$ ............................................. H04B 1/06
[52] U.S. Cl. ...................................... 325/15; 325/305; 325/56
[58] Field of Search .................... 325/305, 301, 1, 3, 325/4, 5, 6, 15, 56; 343/207, 208, 205, 206

[56] References Cited
U.S. PATENT DOCUMENTS

| | | | |
|---|---|---|---|
| 3,085,200 | 4/1963 | Goodall | 325/6 |
| 3,593,147 | 7/1971 | Gurak | 343/205 |
| 3,681,695 | 8/1972 | Cease | 325/305 |

OTHER PUBLICATIONS

"Use of Charge-Coupled Devices for Delaying Analog Signals" IEEE Journal of Solid State Circuits, Apr. 1973, pp. 151-157.

*Primary Examiner*—Robert L. Richardson
*Assistant Examiner*—Michael A. Masinick
*Attorney, Agent, or Firm*—Robert E. Burns; Emmanuel J. Lobato; Bruce L. Adams

[57] ABSTRACT

A diversity system using a phase control circuit for combining respective outputs of a plurality of routes of different path lengths transferring the same analog signal. An analog variable delay circuit, which is capable of controlling its amount of delay by varying the repetition frequency of clock pulses, and a low-pass filter connected to the output of the analog variable delay circuit are inserted in each route other than a reference one of the plurality of receiving routes. A phase difference between the output signal of the low-pass filter and the signal of the reference route is detected. The repetition frequency of the clock pulses is controlled by the detected phase difference for controlling the analog variable delay circuit in a manner to reduce the phase difference, so that the phase difference between the respective output signals of the plurality of receiving routes is substantially negligible to allow combining the output signals. An analog variable delay circuit, whose delay time is controlled by the above clock pulses, is inserted in each route other than a reference one of a plurality of transmitting routes passing through the same transmission medium as the above receiving routes. The diversity in the transmitting routes is accordingly achieved.

5 Claims, 1 Drawing Figure

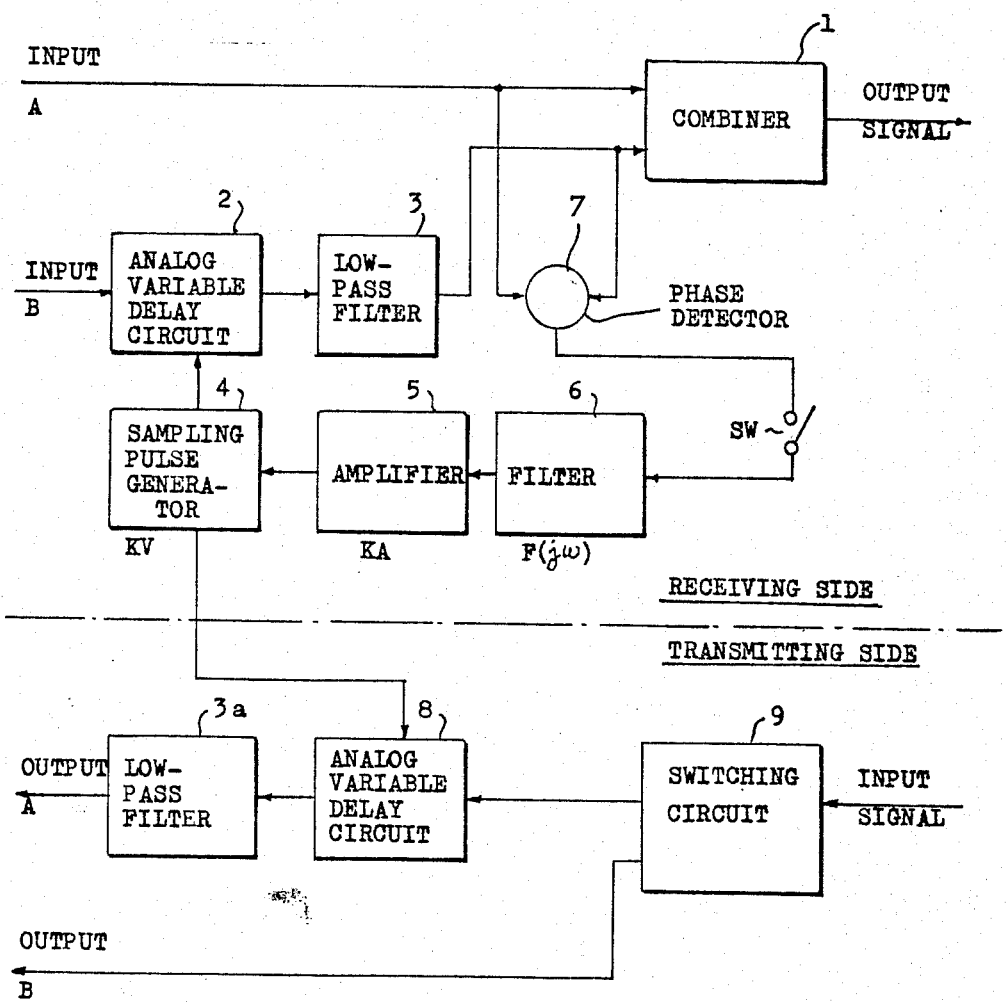

TRANSMITTING AND RECEIVING DIVERSITY SYSTEM

BACKGROUND OF THE INVENTION

This invention relates to a diversity system using a phase control circuit for combining respective outputs of a plurality of routes of different path lengths transferring the same analog signal.

Generally, in a case where respective outputs of a plurality of routes of different path lengths transferring the same analog signal are additively or selectively combined for the purpose of diversity or the like, it is necessary to minimize the phase difference between the received signals of the different routes. For instance, in case of using a frequency band exceeding a frequency of 10GKz in a satellite communication system, space by a distance diversity with two antennas spaced more than 10Km is required for eliminating the influence of rain attenuation. In such a case, an earth station is usually closer to one of the antennas than to the other, and the two paths from the satellite have lengths different from each other so that a resulting difference in delay time between the signals received through the two routes increases in proportion to the space distance of the diversity antennas used. Further, the two path lengths vary with a period of one day due to a figure-8 movement of the satellite. Accordingly, in order to combine the signals of the two routes with each other, it is necessary to remove the delay time difference (an electrical path difference) between the two routes by some means. In case of using a digital signal, since a clock signal exists, a buffer memory, a shift register or the like can be employed as means for absorbing the delay time difference (refer to, for example, Japanese Pat. Disclosure No. 102,512/73). In case of using an analog signal, it is difficult to control the amount of delay and to realize control means for absorbing the delay time difference between the two routes. For example, in a case where a surface elastic wave circuit is employed as an analog delay line for the high-frequency band, it is difficult to realize a control circuit reliable in practical use because of limitations on the transmission characteristics of the circuit, control means of variable delay quantity, the quantity of control, stability of the circuit, etc..

SUMMARY OF THE INVENTION

An object of this invention is to provide a diversity system using phase control circuits for combining respective outputs of a plurality of receiving routes of different path lengths transferring the same analog signal in the same phase condition for the respective received outputs and for achieving the diversity in a plurality of transmitting routes passing through the same transmission medium as the receiving routes.

In accordance with the present invention, an analog variable delay circuit, whose delay amount can be controlled by the frequency of clock pulses, and a low pass filter connected to the output of the analog variable delay circuit, are inserted in each route other than a reference one of a plurality of receiving routes. The analog variable delay circuit is, for example, a charge coupled device (CCD) or a bucket brigade device. A phase difference between the output signal of the low-pass filter and the signal of the reference route is detected. The repetition frequency of the clock pulses is controlled by the detected phase difference for controlling the analog variable delay circuit in a manner to reduce the phase difference, so that the phase difference between the respective output signals of the plurality of routes is substantially negligible to allow combining the output signals an analog variable delay circuit, whose delay time is controlled by the above clock pulses, is inserted in each route other than a reference one of the plurality of transmitting routes passing through the same transmission medium as the above receiving routes. The diversity in the transmitting routes is accordingly achieved.

BRIEF DESCRIPTION OF THE DRAWINGS

This invention will hereinafter be described in detail with reference to the accompanying drawing, in which:

The single FIGURE is a block diagram illustrating an embodiment of the present invention applied to the transmission and reception diversity in satellite communication.

DESCRIPTION OF THE PREFERRED EMBODIMENT

In the drawing, inputs A and B are the respective output signals from respective antenna sites of a space diversity receiving station. The route of the input A is larger in electrical path length than the route of the input B, so that an analog variable delay circuit 2 is inserted in the route of the latter. Reference numerals 3, 3a each indicates a low-pass filter with a transfer function $F(j\omega)$, and 1 designates a combiner for adding or selectively combining two inputs thereof for achieving diversity. Reference numeral 7 identifies a phase detector; 6 represents a filter; 5 denotes an amplifier; and 4 shows a sampling pulse or clock pulse generator for applying sampling pulses to the analog variable delay circuit 2. The repetition frequency of the sampling pulse is controlled by the output voltage of the amplifier 5. Reference numerals 8 and 9 refer to additional circuits for the diversity mode used in the routes for the transmitting side of the station. Outputs A and B are transmission signals respectively corresponding to the inputs A and B at the receiving side, and the output A (or B) is transmitted through the same antenna as that through which the input A (or B) is received. The abovesaid circuits 9 and 8 are respectively a switching circuit for selecting the transmitting route, and an analog variable delay circuit inserted in the transmitting route A.

Next, the operation of this invention will be described in a case where each of the inputs A and B is a single sinusoidal wave. Since the electrical path length of the route of the input signal B is smaller than that of the input signal A, the input signal B is delayed in the analog delay circuit 2. In this case, if a switch SW is not closed, the amount of delay $\tau_o$ is as follows:

$$\tau_0 = (n/f_s) = (2\pi n/\omega_s) \qquad (1)$$

where $f_s$ is the repetition frequency of the sampling pulses produced by the sampling pulse generator 4 and $n$ the number of stages forming the analog variable delay circuit 2. The repetition frequency $f_s$ is based on the bandwidth of the received signal, and, by the sampling theorem, a repetition frequency which is at least more than twice the bandwidth of the received signal is required.

The output signal from the analog variable delay circuit 2 is a PAM signal, which is converted by the low-pass filter 3 to an analog signal, and is applied to the combiner 1, which is combining circuit (or a switching circuit), together with the input A. At this time, it is determined by the type of diversity mode of the system type whether the signals are added or selectively combined.

The phase detector 7 detects a phase difference between the inputs A and B. Then, if the sensitivity of this phase detector 7 is taken as $K_p$(V/rad), the output $V_d$ of the phase detector 7 is given as follows:

$$V_d = K_p \times \theta_e \text{ (rad)}$$

where $\theta_e$ is indicative of a phase difference between the signals of the two routes. The sensitivity $K_p$ usually based on the input level, so that in a case of a multiplex telephone signal, if the input level is constant, the sensitivity may be determined by the mean level.

For the sake of brevity, each of the two demodulated received signals is assumed to the single sinusoidal wave and their frequencies and angular frequencies are taken as $f_0$ and $\omega_0$, respectively. At the same time, the amplitudes of the two signals are taken as one, while the delay time difference resulting from a difference between the path lengths of the inputs A and B is taken as $\tau_r$ (route A > route B). The phase difference $\theta_e$ between the inputs to the phase detector 7 in a case where the switch SW is open is obtained for the circuit shown in the figure in the following manner: Namely, if the amounts of delay by the variable delay circuit 2 and the low-pass filter 3 are taken as $\tau_o$ and $\tau_e$, respectively, the phase difference $\theta_e$ at the certain time $t$ is obtained from the equation (1) as follows:

$$\theta_e = \omega_0(t+\tau_r) - \omega_0(t+\tau_o+\tau_e) = \omega_0\{\tau_r - (\tau_o+\tau_e)\} \quad (2)$$

In this case, $\omega_0(\tau_o+\tau_r)$ is fixed but $\omega_0\tau_r$ varies with the movement of the satellite and $\theta_e$ cannot remain zero. To make $\theta_e$ zero, it is sufficient only to change the repetition frequency of the sampling pulses from the sampling pulse generator 4 which controls the amount of delay of the analog variable delay circuit 2. If, now, $\omega_s$ changes to $\omega_s + \Delta\omega$, the amount of delay $\tau_o'$ in this case is obtained from the equation (1) as follows:

$$\tau_o' = 2\pi n/(\omega_s + \Delta\omega) \quad (3)$$

Accordingly, from the equations (1) and (3), the amount of change in the delay time is as follows:

$$\Delta\tau = \tau_o - \tau_o'$$
$$= 2\pi n \left( \frac{1}{\omega_s} - \frac{1}{\omega_s + \Delta\omega} \right)$$

and if the relationship $\omega_0 >> \Delta\omega$ is maintained, $$\Delta\tau \simeq 2\pi n \cdot \frac{\Delta\omega}{\omega_s^2} \quad (4)$$

Next, a discussion will be made in connection with a case where the switch SW is closed. The value $\Delta\omega$ in the equation (4) is produced by the output from the amplifier 5. Namely, the output $V_d$ from the phase detector 7 is $K_p \times \theta_e$ and, after all, a control voltage is indicated by $K_p \cdot \theta_e \cdot F(j\omega) \cdot KA$, where KA is the amplification factor of the amplifier 5. Accordingly, $$\Delta\omega = \theta_e \cdot K_p \cdot F(j\omega) \cdot KA \cdot K_v$$

where $K_v$ is the modulation sensitivity (rad/sec/volt) of the voltage controlled sampling frequency generator 4.

If $K_t \equiv K_p \cdot KA \cdot K_v$, and $F(j\omega) = 1$
The following result is satisfied.

$$\Delta\omega = \theta_e \cdot K_t \quad (5)$$

From the equations (2), (4) and (5), in case of closing the switch SW, the following relation is obtained:

$$\theta_e = \omega_0\tau_r - \omega_0(\tau_o + \tau_e) - \omega_0\Delta\tau$$

in this case, if $$\omega_0\tau_r \equiv \theta_r$$

$$\omega_0(\tau_o + \tau_e) \equiv \theta_0,$$

It follows that $$\theta_e = \theta_r - \theta_0 - \omega_0 \cdot 2\pi n \cdot \frac{\theta_e \cdot K_t}{\omega_s^2} \quad (6)$$

$$\theta_e = \frac{\theta_r - \theta_0}{1 + \omega_0 \frac{2\pi n K_t}{\omega_s^2}}$$

With closing of the switch SW, the phase difference $\theta_r - \theta_0$ before closing of the switch SW becomes a value as given by the equation (6), and by setting the loop gain $\omega_0 \cdot (2\pi n/\omega_s^2) \cdot K_t$ to be sufficiently large, the phase difference $\theta_e$ approaches zero.

As described above, this invention employs a variable delay circuit, such as CCD, which can be operate in the low-frequency region, and hence is easy to handle, and is capable of easily satisfying the requirement that two same signals of different phases are made in-phase with each other for diversity operation.

Next, a description will be given of the transmitting side shown below the chain line in drawing. In the satellite communication, since transmission and reception signals are transmitted through the same transmission medium including the same large antenna, the transmission path lengths for reception and transmission are equal to each other. Accordingly, in the drawing, the same amount of delay as that in the receiving route of the received input B is given to the signal of a transmitting output A, by an analog variable delay circuit 8 controlled by the clock pulses from the sampling pulse generator 4.

The transmitting output A and a transmitting output B are obtained from the same transmitting input signal by the use of a switching circuit 9.

As a result of this, it is possible to prevent reduction of the diversity effect which is caused by overlapping or dropout of the signal in the switching diversity of the transmission signal.

In the above description, it is assumed that each of the inputs A and B is a sinusoidal wave. However, the above operation can be also obtained for inputs A and B of multiplex signals carrying the same modulation.

What we claim is:

1. A diversity system comprising:
   two receiving input terminals each receptive of a respective output of two signal paths of different path lengths transferring the same analog signal;
   a first analog variable delay circuit connected to one of said two receiving input terminals for developing a first pulse-amplitude modulated signal having an amount of delay controlled in accordance with the repetition frequency of clock pulses applied to the variable delay circuit;

a first low-pass filter connected to the output of said first analog variable delay circuit for converting said first pulse-amplitude modulated signal to an analog output signal carrying the same analog signal waveform as the input of said analog variable delay circuit;

a phase detector connected to the other of said two input terminals and the output of said first low-pass filter for detecting a phase difference between said two outputs thereof;

clock pulse generator means for developing clock pulses at a repetition frequency determined by a control signal applied thereto, and connected to said analog variable delay circuit for applying the clock pulses thereto for controlling the delay time of said analog variable delay circuit, and connected to receive the output of said phase detector for generating said clock pulses at a repetition frequency controlled in accordance with said detected phase difference so as to reduce said phase difference;

a combiner connected to the other of said two receiving input terminals and the output of said first low-pass filter for combining the analog signal applied to the other of said receiving input terminals and the output of said first low-pass filter with substantially a negligible phase difference therebetween to provide a received output signal;

a transmitting input terminal receptive of an analog signal to be transmitted;

switching means connected to said transmitting input terminal for switching said analog signal to be transmitted to obtain a first analog signal to be transmitted and a second analog signal to be transmitted;

a second analog variable delay circuit receptive of said first transmitting analog signal and said clock pulses for developing a second pulse-amplitude modulated signal having an amount of delay controlled in accordance with the repetition frequency of said clock pulses;

a second low-pass filter connected to the output of said second analog variable delay circuit for converting said second analog pulse amplitude modulated signal to an analog signal carrying the same analog signal waveform as the first transmitting analog signal; analog two transmitting output terminals respectively receptive of the output of said second low-pass filter and said second analog signal to be transmitted to selectively transmit the same into one of two transmitting routes including the same transmission medium as said two receiving routes.

2. A diversity system according to claim 1, in which said clock pulse generator means comprises a filter connected to the output of said phase detector, an amplifier connected to the output of said filter, and a controllable clock pulse generator connected to apply clock pulses to said analog variable delay circuits and connected to receive the output of said amplifier for generating said clock pulses having a repetition frequency controlled by the output voltage of said amplifier.

3. In a diversity communication system which receives a plurality of analog signals having the same waveform, relatively shifted in phase, and which are received over different signal paths, and which transmits a plurality of analog signals having the same waveform over the same signal paths that the received analog signals are received; the combination comprising:

signal combining means for combining analog signals applied thereto;

means for applying one of the received analog signals to said signal combining means;

controllable variable delay means responsive to a control signal and receptive of the remaining received analog signals for delaying the remaining received analog signals by respective delay times determined by the control signal and for applying the respective delayed received analog signals to said signal combining means;

phase measuring means for measuring phase differences between the received analog signal applied directly to said combining means and the respective delay received analog signals and for applying a control signal to said controllable delay means for varying the respective delay times of the respective delayed received analog signals to reduce to negligible values the phase differences between the received analog signal applied directly to said signal combining means and the respective delayed received analog signals applied to said signal combining means;

switching means receptive of an analog signal to be transmitted for switching the same between the different signal paths over which the received analog signals are received;

second delay means receptive of one of the analog signals to be transmitted for delaying the same and for applying the delayed analog signal to be transmitted to the signal path over which the received analog signal applied directly to said signal combining means is received; and means for applying the remaining analog signals to respective ones of the other signal paths.

4. In a diversity communication system according to claim 3, wherein there are two different signal paths, two transmitted analog signals, and two received analog signals; said second delay means comprises second controllable variable delay means responsive to and receptive of the control signal developed by said phase measuring means by delaying the analog signal to be transmitted by a delay time determined by the control signal.

5. In a diversity communications system according to claim 4, wherein said first and said second controllable variable delay means each comprise an analog variable delay circuit and a low-pass filter in cascade.

* * * * *